United States Patent [19]
Fraleigh et al.

[11] 3,748,841
[45] July 31, 1973

[54] APPARATUS AND METHOD FOR MAKING CABLE BEAD

[75] Inventors: Marion Foster Fraleigh, Stow; Raleigh Warren Wise, Akron, both of Ohio

[73] Assignee: Monsanto Company, St. Louis, Mo.

[22] Filed: June 7, 1971

[21] Appl. No.: 150,584

[52] U.S. Cl. .................................. 57/21, 57/158
[51] Int. Cl. ............................................ D02g 3/48
[58] Field of Search .............. 57/1, 9, 21, 6, 158, 57/156; 245/1.5; 152/362

[56] References Cited
UNITED STATES PATENTS

| | | | |
|---|---|---|---|
| 1,327,170 | 1/1920 | Pratt | 57/21 |
| 1,414,828 | 5/1922 | Pratt | 57/21 |
| 1,415,696 | 5/1922 | Pierce | 57/21 |
| 3,130,534 | 4/1964 | Osterman | 57/9 |

*Primary Examiner*—Donald E. Watkins
*Attorney*—Richard O. Zerbe, Larry R. Swaney and Neal E. Willis

[57] ABSTRACT

A cable bead or grommet is made by rotating an annular metal core, feeding to it substantially undistorted, metal strand and moving the supply of strand successively about the core with respect to an axis passing through its centers of cross sections while confining the path of the supply to avoid straining the strand beyond its resilience limit and synchronizing said moving of the supply with rotation of the core to apply contiguous strands.

10 Claims, 5 Drawing Figures

PATENTED JUL 31 1973

INVENTORS.
MARION FOSTER FRALEIGH
& RALEIGH WARREN WISE

BY Richard O. Zerby
AGENT

APPARATUS AND METHOD FOR MAKING CABLE BEAD

This invention relates to an apparatus and method for making cable beads or grommets particularly for pneumatic tires.

BACKGROUND OF THE INVENTION

Cable beads or grommets comprising an annular core or wire covered by several spirals or convolutions of strand wire were described early in the art. A characteristic of the type of cable bead wherein the core is independent of the spiral wrap or strands and the strands are smaller in diameter than the core is that imposition of a bursting stress on the cable will cause the convolutions of the spiral to grip the core tightly and the uniform distribution of stress throughout the cable provides great strength. Such beads are especially desirable for radial tires.

Prior methods of making cable beads have taken various forms but generally depart from making beads strictly of the aforesaid type and thereby compromise some of the desirable properties. One method is to use a continuous piece of wire for both the core and strand, the wire being wrapped upon itself under sufficient tension to distort it and bend it to lay tightly on the core. Another method is to subject the strand wire to a precrimping or spiraling operation and then wrap the pre-spiraled wire without further distortion. Both methods are to an extent self defeating with respect to achieving maximum gripping action of strand wire upon the core when the bead is subjected to bursting force.

SUMMARY OF THE INVENTION

The method of forming a cable bead according to this invention comprises supporting and rotating an annular metal core and feeding substantially untensioned metal strand to the core while moving the supply of strand successively about the core with respect to an axis passing through its centers of cross section and confining the path of the point from which strand is fed to the core so as not to strain the strand beyond its resilience limit, the speed of the aforesaid motions being synchronized to provide contiguous wrap of strand. By substantially untensioned is meant that the tension, if any, is the natural spring tension of the metal strand and is below that which would cause permanent deformation of the strand in applying it to the core in contrast to a known method wherein the strand is deliberately subjected to sufficient tension to bend it to lay tightly on the core.

Preferably the strand applied to the core is substantially undistorted and in any event it is not subjected to precrimping or preforming in the spiral contour it is to assume on the core as in one well known technique. Any permanent curvature is desirably less than the curvature of the core to which it is applied. Thus, the natural deformations occurring in manufacturing and storing strand for furture use can usually be tolerated. Substantially undistorted status desirable for strand wire fed to the core contemplates normal commercial supplies of bead wire. However, if the available strand wire has been subjected to too much strain, it may be treated in known manner to reduce the distortion before applying it to the core.

On the other hand, preforming may be necessary where otherwise the natural spring tension of restrained strand acting against a restraining means would be too great to permit smooth withdrawal of strand from the supply. The supply will usually be in coil form in a canister or restrained on a reel by a shroud. As the diameters of the reel and shroud diminish, the necessity of preforming strand to lay on the reel increases. When the wire is reduced to a state such that it naturally wants to remain in a coil of size conforming to the reel size, the spring tension of the wire resists removal from the reel. Wire restrained in a coil approximately the size of the reel but with a natural tendency to assume larger coil size also resists removal from the supply due to the spring tension of the wire but in this instance the spring force acts against the restraining means. As explained hereinafter, selection of the desired reel size involves a compromise between conflicting principles.

Application of substantially untensioned wire strand to core without substantial permanent distortion thereof is accomplished by storing a supply of strand in coil form under its own spring tension and confining the path of the points from which wire is fed to the core so as not to strain the wire beyond its ability to recover its original size and shape by providing for discharge of strand from the supply coil at points which when outside the plane defined by the circumferential center line of the core are always a perpendicular distance from said plane less than the radius of the supply coil. Of course, the number of convolutions of strand is below the number which would of necessity exceed the resilience limit of the strand. The ideal absence of permanent distortion of strand wire is illustrated by removing strand from the finished bead and finding that it returns essentially to its original form. The angle of the strand wire with respect to the plane of the core can be varied as desired within the resilience limit of the wire. Permissible limits for wire of given spring characteristics will be inherently determined by the diameters respectively of the annular core, of the wire forming the annular core, and of the strand wire itself.

The synchronization provides for starting each successive wrap at a different position on the core. The core movement must be a little faster than the supply movement because the core must be a little further advanced at the beginning of the next convolution to permit each succeeding convolution of strand wrap to lie contiguous to the preceding one. The motion of the supply is therefore synchronized with the rotational motion of the core to achieve the desired contiguous covering, but the strands do not necessarily touch one another throughout their length. Because any error is cumulative with each succeeding strand, the synchronizing error is desirably kept below 1 percent.

The apparatus for applying the aforesaid principles conveniently may include more or less conventional means for supporting and rotating an annular core, for storing a supply of strand in coiled form and for synchronizing the speeds of the supply and core movements. The supply may contain strand sufficient for one or more beads, and it is feasible to allow somewhat greater length than required and cut the excess at the end, but it is possible to operate with predetermined lengths of strand and thereby avoid cutting strand after wrapping the core.

In one embodiment of the invention a supply of predetermined length of strand wire is maintained in coil form without deformation except under its own spring tension. The length may be calculated from the relationship Length = Circumference multiplied by the times the strand is to be wrapped and multiplied by the secant of the angle of lay with respect to an axis coincident with the plane of the core. A supply of strand in the form of relativly large loops which may approach the maximum which will go through the core avoids preforming the strand supply and easily provides sufficient strand for one or more beads without unacceptable distortion. A disadvantage is that the shorter the length of strand from the coil to the point where it contacts the core, the greater the angle it subtends as the coiled supply crosses a plane containing the circumferential centerline of the core and therefore the greater is the tendency to strain the wire so that a compromise between the conflicting principles must be made. For wrapping 15 in. diameter cores with nominal 0.06 in. diameter strand, a coil of about 7-8 in. diameter is feasible.

Moreover, another advantage of a relatively large reel is that it further minimizes distortion by feeding strand more or less tangent to the core thereby minimizing the angle formed by the strand and the tangent to the core at the point the strand contacts the core. For similar reasons the strand is desirably fed at approximately the angle of lay which is usually small, say on the order of 3°-9°. Accordingly, the points from which the strand is fed are desirably kept close to the core as the strand supply moves about the core. One embodiment for applying the aforesaid principle is to subject the coiled supply substantially to rectilinear motion in a manner which provides juxtaposition of the core and supply as the supply moves beside the core.

It will be appreciated that one or several layers of strand may be applied to the core. Each layer of strand is usually wound opposite that of the previous layer. According to the usual convention a 1 + 9 cable indicates a core with a single layer of nine strands. Thus, a cross section of the cable would comprise a central core surrounded by 9 strands. Similarly, a 1 + 8 + 15 + 20 cable indicates a central core covered by eight strands and having in addition another layer of 15 strands and finally an outer layer of 20 strands. The core may comprise single or multiple units.

DETAILED DESCRIPTION

Figure 1:
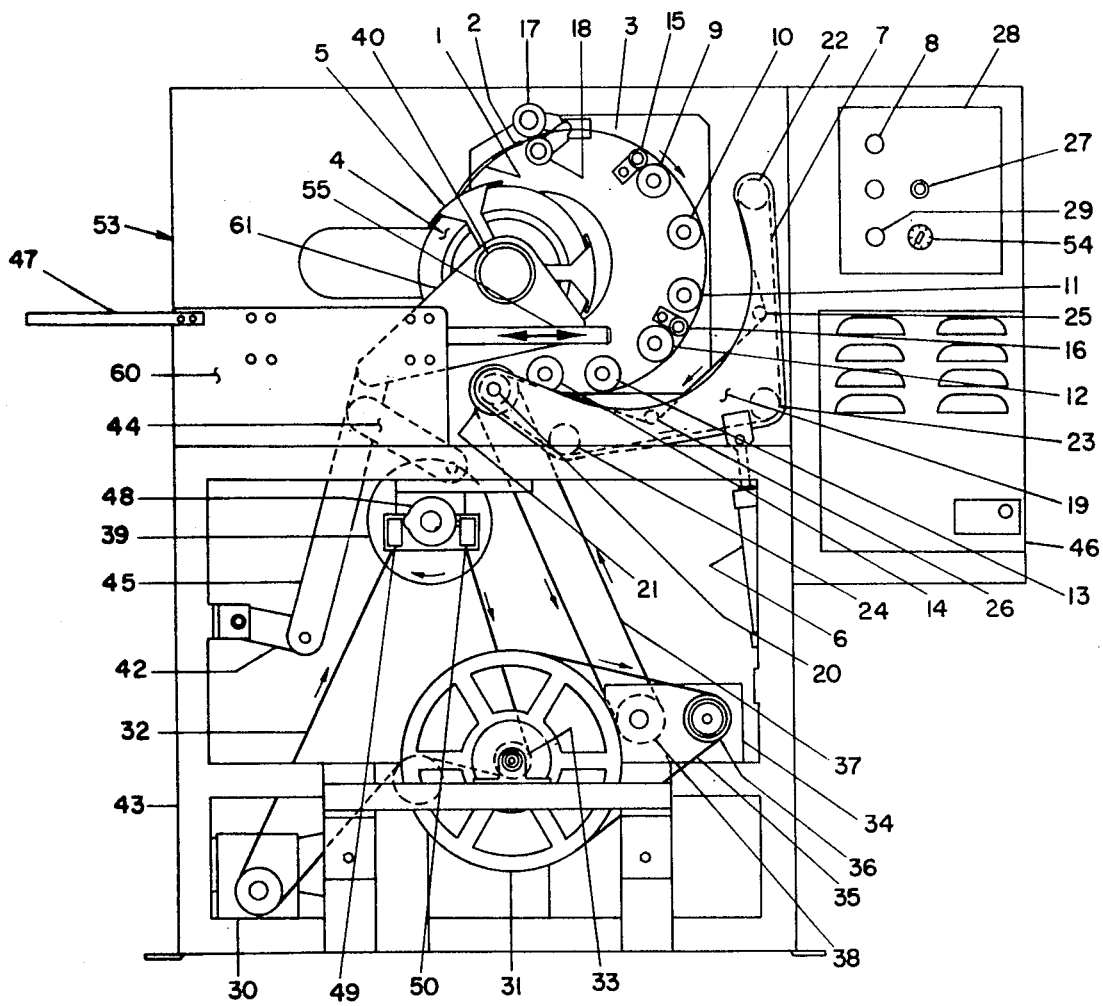
FIG. 1 is a side elevation of an apparatus for manufacture of a cable bead.

Referring to FIG. 1, the apparatus with the core and strand in place is illustrated in its condition just prior to actuating the mechanism to start the manufacture of a cable bead. An end of the strand 1 is secured by Mylar tape 2 to the core 3. A supply of strand is confined on the reel of reel assembly 4 by shroud 5. The belt drive clamping cylinder 6 upon actuation brings timing belt 7 into frictional contact with bead core 3. Upon actuating starting switch 8 the core and ensuing bead rotate in the direction of the arrow over six rubber faced rollers 9, 10, 11, 12, 13 and 14. Grooved guides 15 and 16 in conjunction with grooved rotary guides 17 and 18 keep the rotating bead in a vertical plane. The grooved rotary guides 17 and 18 are held by spring pressure against the rotating bead. The belt drive assembly which drives the bead comprises a frame one side of which 19 is visible and is pivotally mounted on shaft 20 on which shaft is also mounted notched pulley 21 shown by phantom lines which drives timing belt 7 over three other notched pulleys 22, 23, 24 and smooth small idler pulleys 25 and 26. The belt is pressed against the bead at three points, one between the two idler pulleys and at two points on the opposite side of each idler pulley through actuation of a clamping cylinder 6, the control switch of which 27 is located in the operator's panel 28 together with the starting and stopping switches 8 and 29 for the motor 30. The clamping cylinder moves the bead drive assembly around the pivot point which comprises shaft 20 thereby bringing the timing belt into frictional contact with the bead, the idler pulleys thereupon approaching but not quite contacting the bead.

The power is supplied by gear motor 30 which drives large pulley 31 by means of timing belt 32 to pulley 33 integral with said large pulley. Large pulley 31 in turn drives a positive variable speed gear box or transmission 34 by means of timing belt 35 to pulley 36 of the gear box. Another timing belt 37 from the gear box to the bead drive assembly is driven by the output of the transmission by pulley 38 shown in phantom lines. It transmits power to the bead drive assembly already described. The variable speed gear box serves as a synchronizer by which the ratio of the bead speed to the reel carriage speed can be adjusted as required. The gear motor 30 also drives the carriage assembly for the reel by aforesaid timing belt 32 which supplies power to the eccentric drive 39 at the same time as it transmits power to large pulley 31 through pulley 33 shown in phantom lines mounted on the same shaft as aforesaid large pulley 31. Thus, both the carriage assembly and bead are driven from a single power source.

The eccentric moves the carriage assembly back and forth in the direction of the double arrows. At the extremities of the carriage motion double acting air cylinder 40 serves as means to shift the reel assembly to the other side of the bead. The reel assembly is mounted on the inner portion of said double acting air cylinder and is transferred to the inner portion of a second double acting air cylinder (41 of FIG. 2) as the direction of motion of the carriage reverses. One of three carriage drive connecting links 42 is pivotally attached to frame 43; another 44 is pivotally attached to eccentric 39 and both are pivotally attached to a third carriage drive connecting link 45 which in turn is pivotally connected to a linkage bar (FIG. 2) uniting plate 46 and its counterpart on which the air cylinders and reel are mounted. A guard 47 surrounds the space beyond the frame through which the rods of the carriage move to prevent injury from too close proximity to the mechanism. Cam 48 engages microswitches 49 and 50, one of which at one limit of the carriage movement actuates air cylinder 40. Rod 55 on one side of the carriage assembly is secured to plate 61 by short studs (See FIG. 2) on which plate air cylinder 40 is mounted. Two slotted bearings which support one side of the carriage assembly are bolted to plate 53 of a frame which supports the carriage assembly. The speed of production is controlled by the output to the gear motor, the control 54 for which is located in panel 28, and the electronic motor controller is in a compartment behind cover 46.

Figure 2:
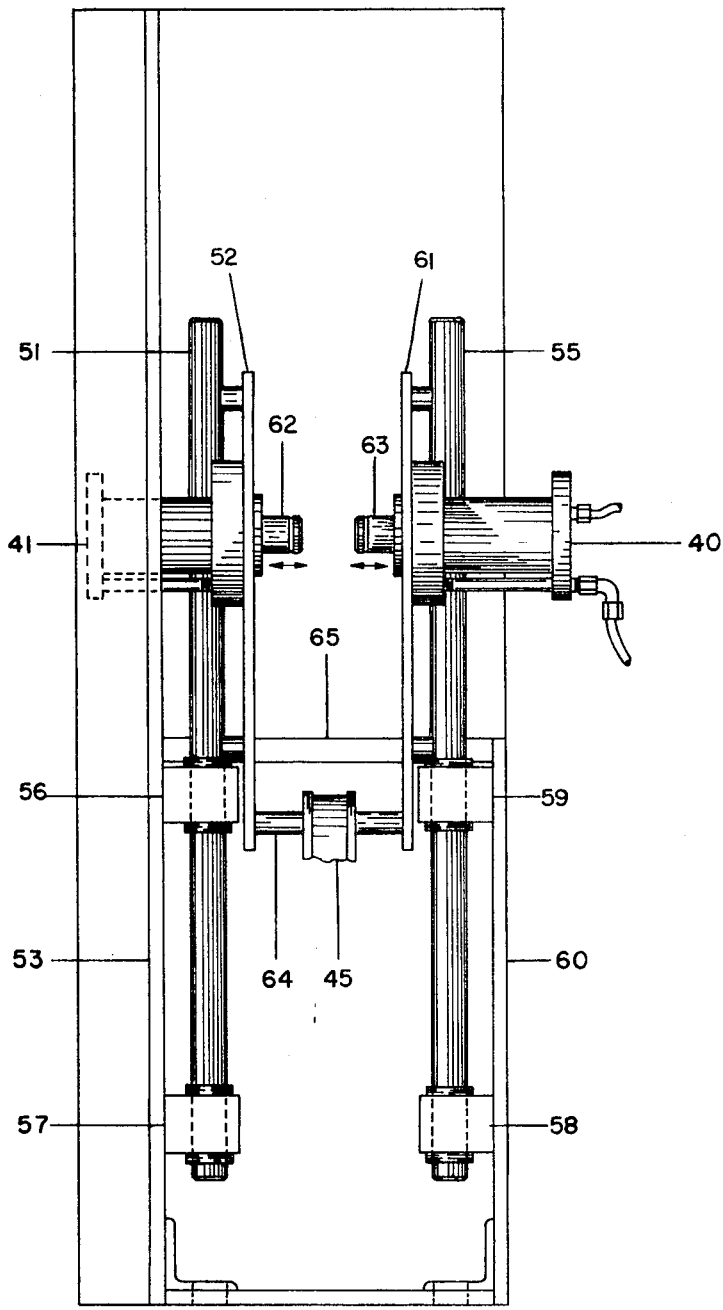
FIG. 2 is a top view of the carriage assembly with the core and strand supply removed.
Figure 3:
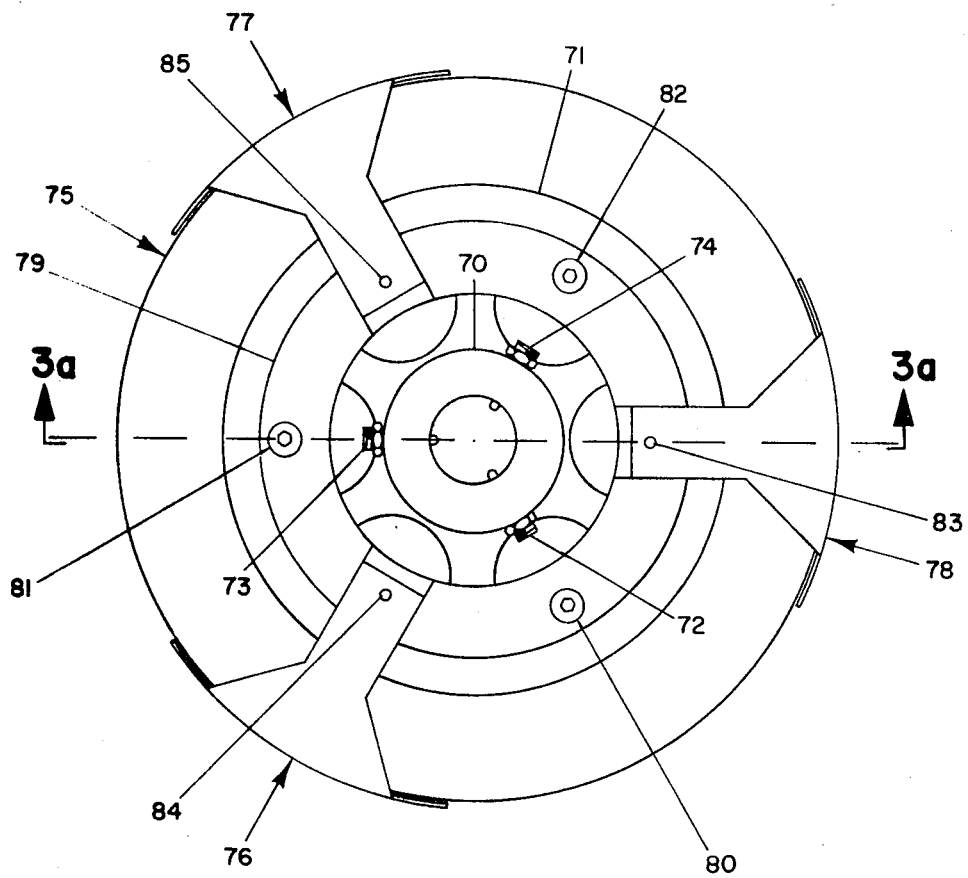
FIG. 3 is a side view which illustrates details of the reel and shroud.

The motion of the reel assembly as it proceeds past the core is shown in greater detail by the top view of the carriage assembly illustrated in FIG. 2. For greater clarity the carriage assembly is shown with the reel and core removed. The carriage assembly comprises rods 51 and 55, slidably moveable through four slotted bearings 56, 57, 58 and 59, which bearings are firmly attached to plates 53 and 60 of a frame. The slidable rods are attached to plates 52, 61 by short rods or spacers and on the plates are mounted air cylinders 40 and 41. The pistons 62 and 63 of the air cylinders move in the direction of the double arrows and are grooved at the ends to receive spring loaded plungers or detents of the reel (FIG. 3). The plates 52 and 61 are joined by rod 64 on which is pivotally mounted linkage arm 45 which transmits the driving force to the carriage assembly. A brace 65 links the two sides of the frame beneath the carriage assembly to provide greater strength. When the carriage reaches one extremity of its rectilinear motion parallel to the plane of the core, the air cylinder is actuated by the micro switch and transfers the reel to the other cylinder whereupon the carriage continues in the opposite direction.

Figure 4:
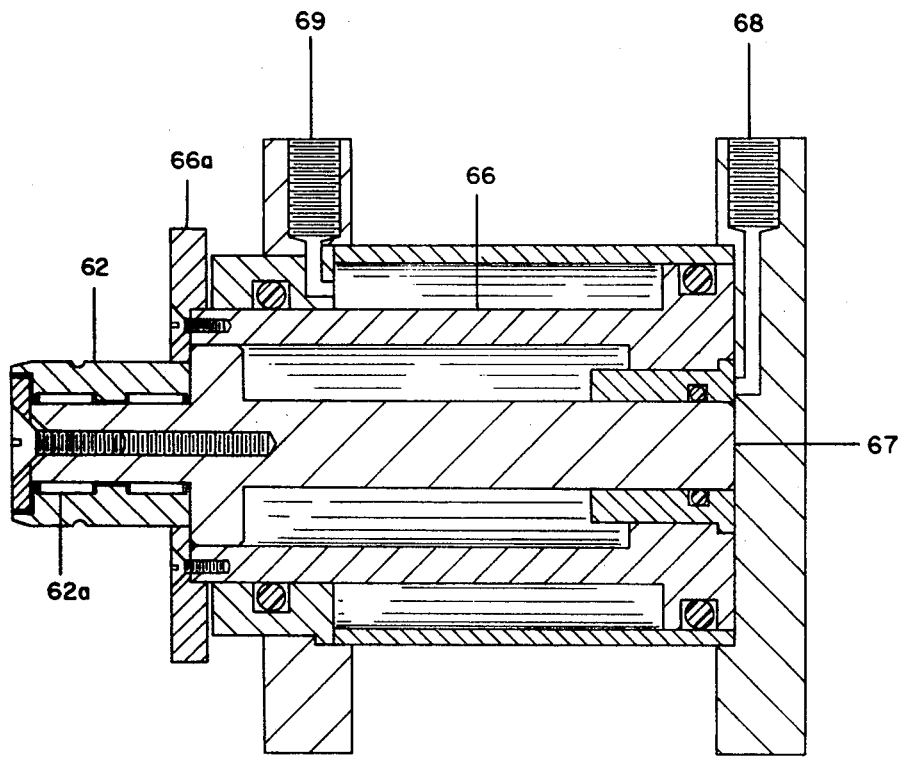
FIG. 4 is a cross section of an air cylinder for effecting transfer of the reel and shroud.

FIG. 4 is a cross section of one of the double acting air cylinders used to transfer the reel. When reel transfer takes place (at either end of the carriage rectilinear motion) cam 48 activates micro switch 49 or 50 causing compressed air to enter port 68 thereby causing the large piston 66 and the smaller piston 67 to move together away from port 68. The pistons continue to move until the notched axle of the reel assembly 62 on the small piston hits its counterpart on the other cylinder. This stops the travel of the axle and small piston 67. The larger piston 66 and flange 66a attached thereto continue their motion pushing the reel from axle 62 onto the axle of the opposite cylinder, thereby effecting reel transfer. The reel is held onto the opposite axle by detents. Air pressure is then returned to port 69, its normal position, by the elapse of dwell time of cam 48 deactivating micro switch 49 or 50. The air forces both pistons to return toward port 68 until they seat. This positions the cylinder for the next transfer of the reel. Rotary motion of the reel while in place on the axle 62 is allowed by a needle bearing 62a mounted between the axle 62 and the small piston 67.

Further details of the reel assembly are shown in FIG. 3. The hole in the center of hub 70 of a housing 71 receives the axle on a piston of the air cylinder (FIG. 2) for mounting the reel assembly. Three spring loaded plungers 120° apart 72, 73 and 74, retain the hub in position on the piston of the air cylinder by a groove in the air cylinder axle (FIG. 2). Around the periphery of the housing is mounted the reel 75 which is firmly fixed to the housing. The reel in turn is surrounded by a shroud 5 independently rotatable with respect to the reel which comprises three sections, two solid 76 and 77, and one slotted 78, to provide for discharge of the wire strand. Portions of the metal are cut away from the housing 71 around the periphery of the hub to lighten the reel assembly. A bearing mounting ring 79 fastened by three screws 80, 81 and 82 confines ball bearings on which the shroud rotates. The shroud is also fastened to the bearing mounting ring 79 by screws 83, 84 and 85.

Figure 3A:
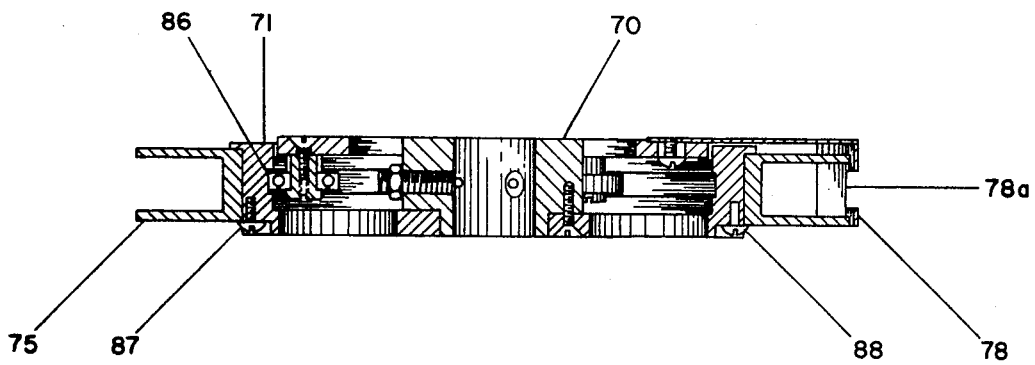
FIG. 3a is a cross section of the reel and shroud along line AA of FIG. 3.

FIG. 3a shows a cross section of the reel assembly perpendicular to its axis along line A—A of FIG. 3 through the slotted portion of the shroud. The shroud 5 with its wire discharge slot 78a is mounted by ball bearings 86 inserted in the reel housing by which it is independently rotatable with respect to the reel. Reel 75 for holding the strand wire is fixed to the housing 71 by screws 87 and 88. The function of the spring loaded plungers 72, 73 and 74 as has been explained is to locate the reel on the piston of the air cylinder and fix it in place.

The apparatus described minimizes distortion of the wire strand by keeping the reel close to the plane of the core as it proceeds in its forward and backward motion. There may be for example about ⅜ inch clearance between the reel and the core. Close proximity provides for a maximum angle between the section of wire strand from the reel to the core and the plane of the reel. It will be appreciated that when the reel is on the inside of the core hoop the distance between the center point of the reel and the core is considerably greater than the distance between said center point and the core when the reel is directly beside the core or in other words when the axis of the reel is coincident with a point on the axis of the core through its centers of cross sections.

The general operation of the apparatus will now be described for the preparation of a 1 + 9 cable comprising an annular core of 15.281 in. inside diameter (15 9/32 in. ) formed from 0.118 in. diameter SAE 1008 low carbon steel surrounded by 9 lays of strand, each lay wrapping the core eight times and composed of 0.059 in. diameter (nominal 0.06 in.) SAE 1070 bronze dip bead wire, the toal length of strand being 36 ft. 5 in. An end of the aforesaid predetermined length of strand is temporarily fastened to said core. No permanent connection of strand to core is desired and to start the process a piece of Mylar tape will suffice to hold the strand on the core and still permit some movement, if necessary, to conform to a natural angle of lay for the system. The wire is taped to the core at approximately the desired angle of lay and the tape need not necessarily be removed, but if removal is desired a soluble tape, for example, cellulose acetate tape, may be used. The belt drive clamping cylinder 6 is then actuated by switch 27 and the core and carriage put into motion by activating starting switch 8. The rotation of the core pulls wire from the strand supply confined by the reel shroud.

The reel simply floats with respect to the rotation of the core and there is very little tension on the wrap wire resisting withdrawal by the rotating core. The slight spring tension under which the wrap wire is confined on the reel provides slight resistance to withdrawal and automatically tends to control rotation of the reel so that little or no unwinding of wire occurs ahead of that required to wrap the core. It will be appreciated that the wrap wire is not really wound around the reel but simply restrained in loops around it in the form of a coil. The shroud is preferably independently movable with respect to the reel to aid the movement of the wire outlet which must change position as the reel proceeds back and forth.

In the position illustrated in FIG. 1 the reel and supply of strand are in front of the core and the carriage assembly continues to move parallel with the plane of the bead toward the opening in the bead hoop until clearance is provided whereupon the reel shifts to the axle of the opposite air cylinder 41 and moves in the opposite direction on the back side of the bead until clearance is provided for a shift to the front of the bead again whereupon the carriage assembly again reverses direction. The operation is continued until the strand supply is exhausted and then the two ends of strand now constituting the wrap wire are fitted into a ferrule crimped in the middle to connect the ends of the wrap wire to provide the finished bead.

The two ends of wrap wire remaining at the end of the operation require some restraint to keep them from lifting from the core but are otherwise left floating. The ferrule and its use are well known in the cable bead art and serve to maintain the free ends of the wire in alignment during the relative movement of the ends.

It is intended to cover all changes and modifications of the examples of the invention herein chosen for purposes of disclosure which do not constitute departures from the spirit and scope of the invention.

The embodiments of the invention in which an exclusive property or privilege is claimed are defined as follows:

1. Apparatus for forming a cable bead comprising
means for supporting an annular bead core and rotating it about its axis of symmetry,
means for storing a supply of strand in coil form,
means for feeding strand to said core from the supply coil,
means for moving the supply of strand successively about said core with respect to an axis passing through its centers of cross sections,
means for applying strand to the core at a strain below its resilience limit by providing for discharge of strand from the supply coil at points which when outside the plane defined by the circumferential center line of the core are always a perpendicular distance from said plane less than the radius of the strand coil.

2. Apparatus for forming a cable bead comprising
means for supporting an annular bead core and rotating it about its axis of symmetry,
means for storing a supply of strand in coil form,
means for feeding strand from the supply to the core substantially untensioned except for its own spring tension,
means for moving the supply of strand successively about the annular core with respect to an axis passing through its centers of cross sections cooperating with means to maintain a perpendicular to the axis of the supply coil disposed parallel to the plane of moving said supply of strand around said core parallel to the plane defined by the circumferential center line of the core and to provide for discharge of strand from the supply coil at points which when outside said center line plane are always a perpendicular distance from said plane less than the radius of the strand coil, said moving means being synchronized with rotation of the annular core to apply contiguous strands.

3. Apparatus of claim 2 wherein the storing means includes means for restraining the strand in reduced coil size.

4. Apparatus of claim 3 wherein the storing means comprises reel and shroud and the motion of the reel is substantially rectilinear.

5. Apparatus of claim 2 which includes means for varying the synchronization.

6. Method of forming a cable bead which comprises supporting an annular bead core, continuously rotating it about its axis of symmetry, feeding strand to the rotating core from a supply thereof while moving said supply about the annular core with respect to an axis passing through its centers of cross section, confining the strain of the wire throughout said moving below its resilience limit and synchronizing the speed of said moving with the speed of said rotating so as to apply contiguous strands.

7. Method of claim 6 wherein the supply is in coil form and distortion is minimized by maintaining a perpendicular to the axis of the supply coil disposed parallel to the plane of moving said supply of strand around said core parallel to the plane defined by the circumferential center line of the core and discharging from the supply coil at points which when outside said center line plane are always a perpendicular distance from said plane less than the radius of the supply coil.

8. Method of claim 7 wherein the strand supply is confined under its own spring tension and is fed to the core substantially under said tension.

9. Method of claim 7 wherein the supply comprises a predetermined length of strand.

10. Method of claim 7 wherein the rotation of the core removes strand from the supply the resistance to removal consisting essentially of forces due to the spring tension of the strand.

* * * * *